(12) United States Patent
Cameriano et al.

(10) Patent No.: US 7,909,573 B2
(45) Date of Patent: Mar. 22, 2011

(54) CASING COVER IN A JET ENGINE

(75) Inventors: Laurent Bernard Cameriano, Avon (FR); Sylvain Duval, Tournan en Brie (FR); Eric Masson, Bois le Roi (FR); Herve Bernard Plisson, Vaux le Penil (FR)

(73) Assignee: SNECMA, Paris (FR)

( * ) Notice: Subject to any disclaimer, the term of this patent is extended or adjusted under 35 U.S.C. 154(b) by 1040 days.

(21) Appl. No.: 11/687,406

(22) Filed: Mar. 16, 2007

(65) Prior Publication Data

US 2007/0217911 A1 Sep. 20, 2007

(30) Foreign Application Priority Data

Mar. 17, 2006 (FR) ...................................... 06 02353

(51) Int. Cl.
*F01D 25/26* (2006.01)
*F01D 25/24* (2006.01)
*F03D 11/04* (2006.01)
(52) U.S. Cl. .................. 415/213.1; 415/134; 415/214.1; 415/220
(58) Field of Classification Search .................. 415/108, 415/134, 135, 213.1, 214.1
See application file for complete search history.

(56) References Cited

U.S. PATENT DOCUMENTS

| 4,979,872 | A | | 12/1990 | Myers et al. | |
| 5,597,286 | A | | 1/1997 | Dawson et al. | |
| 6,148,518 | A | * | 11/2000 | Weiner et al. | 29/889.2 |
| 6,203,273 | B1 | * | 3/2001 | Weiner et al. | 415/173.4 |
| 7,571,614 | B2 | * | 8/2009 | Lejars et al. | 60/796 |

FOREIGN PATENT DOCUMENTS

GB 2 226 600 A 7/1990

\* cited by examiner

*Primary Examiner* — Ninh H Nguyen
*Assistant Examiner* — Sean J Younger
(74) *Attorney, Agent, or Firm* — Oblon, Spivak, McClelland, Maier & Neustadt, L.L.P.

(57) ABSTRACT

A casing cover for enclosing a casing in a jet engine is disclosed. The casing cover includes two coaxial shells arranged one inside the other and radial envelopes which connect the two coaxial shells. Radial arms of the casing extend inside the radial envelopes. The cover is fastened at its downstream end to a first element of the casing and axially abuts at its upstream end on a second element of the casing. In a free state, an axial dimension of the cover of less than the axial distance of the casing between the point where the first element of the casing is fastened to the downstream end of the cover and the point where the second element of the casing axially abuts the upstream end of the cover such that the cover is tensioned axially when it is mounted on and fastened to the casing.

13 Claims, 2 Drawing Sheets

CASING COVER IN A JET ENGINE

BACKGROUND OF THE INVENTION AND DESCRIPTION OF THE PRIOR ART

The present invention relates to a casing cover such as an exhaust casing cover in a jet engine, this cover comprising two coaxial shells arranged one inside the other and joined fixedly by radial envelopes inside which extend radial arms of the casing.

This type of cover is mounted around a jet engine bearing support and thermally protects the exhaust casing from the stream of hot gas which originates from the combustion chamber and from the turbine of the jet engine and which flows between the shells of the cover.

The cover is fastened at its downstream end to a flange of the bearing support by means of bolts and, at rest, bears at its upstream end on the casing so as to be able to expand freely under the effect of the rise in temperature during the operation of the jet engine.

However, the thermal expansion of the cover, which is greater than that of the casing, precludes the upstream end of the cover from bearing on the casing, at least during the transient phases between the idling mode and the full-power operation of the jet engine. The cover is thus mounted in cantilever fashion on the bearing support via its downstream end, and is subjected to considerable vibration stresses which may result in the appearance of fissures or cracks.

One solution to this problem would consist in modifying the geometry of the cover and/or in reinforcing it by means of stiffeners. However, this solution is not satisfactory since it is costly and leads to an increase in the mass of the cover, this being a disadvantage in the aeronautical industry.

SUMMARY OF THE INVENTION

The object of the invention is in particular to provide a simple, effective and economic solution to these problems.

To this end, the invention provides a casing cover in a jet engine, comprising two coaxial shells arranged one inside the other and joined fixedly by radial envelopes inside which extend radial arms of the casing, the cover being fastened at its downstream end to an element of the casing and bearing axially at its upstream end on another element of the casing, wherein the cover has, in the free state, an axial dimension of less than the axial distance between the points where its downstream end is fastened to the casing and the points where its upstream end bears axially on the casing, and is tensioned axially when it is mounted on and fastened to the casing.

The axial tensioning of the cover when it is mounted on the casing makes it possible to compensate for the deviation between its axial thermal expansion and the axial thermal expansion of the casing in order to keep its upstream end bearing axially on the casing during the operation of the jet engine, thereby preventing the cover from being subjected to considerable vibration stresses.

According to a feature of the invention, the difference between the axial dimension of the cover, in the free state, and the axial distance between the points where its downstream end is fastened and the points where its upstream end bears axially is substantially equal to the maximum value of the deviation between the axial thermal expansion of the cover and the axial thermal expansion of the casing during the operation of the jet engine. Thus, the upstream end of the cover always remains bearing axially or radially on the casing whatever the operating mode of the jet engine, this being sufficient to prevent the appearance of vibration stresses in the cover.

This difference is, for example, approximately 1 to 1.2 millimeters in one particular embodiment.

The cover is, for example, fastened at its downstream end to a flange of a bearing support by means of bolts and comprises, at its upstream end, an outwardly oriented radial lip, this radial lip being situated to the inside and upstream of a radial lip formed at the upstream end of a cylindrical element of the casing, the radial lip of the upstream end of the cover bearing axially on the radial lip of the casing element when the cover is mounted on the casing.

The radial lip of the cover is advantageously formed on an outer shell of the cover which, as a result of thermal expansion, can bear radially on the casing element during the operation of the jet engine, thereby making it possible to keep the upstream end of the cover bearing axially and/or radially on the casing.

When the cover has reached its maximum axial thermal expansion in relation to that of the casing, the radial lip of the cover is flush with the radial lip of the casing and the shell of the cover bears radially on the casing element. The upstream end of the cover thus always remains bearing on the casing whatever the operating mode of the jet engine.

The invention also relates to a jet engine which comprises at least one casing cover, in particular an exhaust casing cover, as described above.

BRIEF DESCRIPTION OF THE DRAWINGS

The invention will be better understood and other details, features and advantages of the present invention will become apparent on reading the description given below by way of nonlimiting example and with reference to the appended drawings, in which.

DESCRIPTION OF THE PREFERRED EMBODIMENTS

Figure 1:
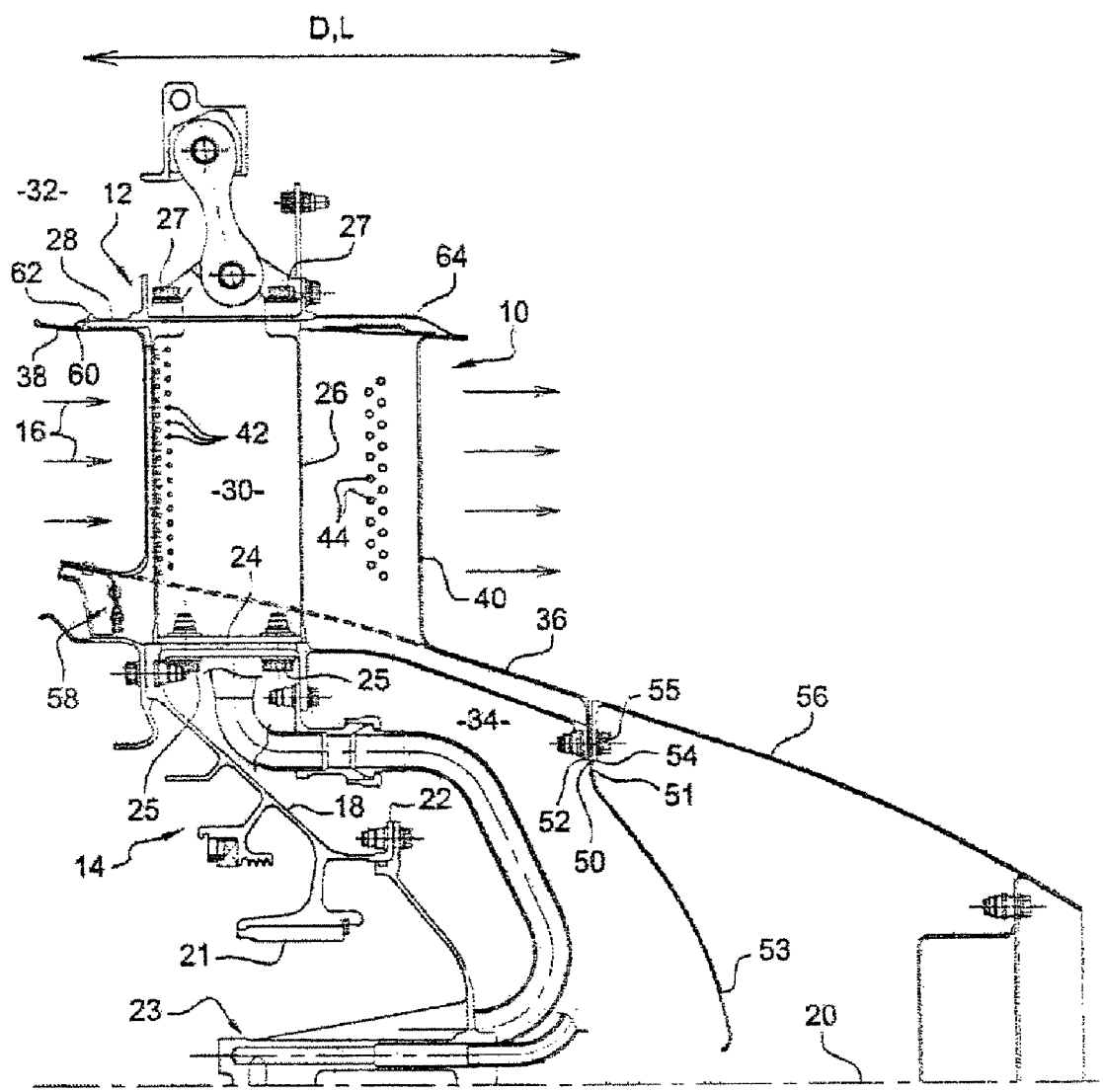
FIG. 1 is a schematic half-view in axial section of an exhaust casing cover according to the invention.

FIG. 1 shows a cover 10 of an exhaust casing 12 of a jet engine, which is mounted around a bearing support 14 and which makes it possible to thermally protect the casing 12 from a stream of hot gas 16 originating from the combustion chamber (not shown) and from the turbine (not shown) of the jet engine.

The bearing support 14 comprises a substantially frusto-conical wall 18 extending downstream toward the axis 20 of the jet engine and bearing an outer race 21 of a bearing (not shown) for centering and guiding a shaft of the jet engine. The wall 18 of the bearing support comprises, at its downstream end, a flange 22 for fastening to bearing lubrication means 23 and is connected, at its upstream end, to an upstream end of a substantially cylindrical wall 24.

The exhaust casing 12 comprises nine radial arms 26 which are fastened at their internal ends to the cylindrical wall 24 of the bearing support by means of radial bolts 25 and at their external ends to a cylindrical element 28 of the casing by means of radial bolts 27.

Each radial arm 26 comprises an internal cavity 30 for the circulation of cooling air originating from a supply enclosure 32, radially external to the casing element 28, and discharged partly into an enclosure 34 which is radially internal to the wall 24 of the bearing support and which is delimited by this wall 24 and the frustoconical wall 18 of the bearing support.

The cover 10 is in one piece and comprises two coaxial shells 36 and 38 which extend one inside the other and which are connected by nine radial envelopes 40 inside which extend the radial arms 26. The internal shell 36 extends outside and at a distance from the wall 24 of the bearing support and the external shell 38 extends inside and at a distance from the casing element 28.

Each envelope 40 has an axially profiled shape and the radial arm 26 extends inside an upstream portion of the envelope and at a distance therefrom.

The radial arm 26 comprises, upstream, holes 42 which open out toward the upstream end portion of the envelope 40, which itself comprises, downstream, holes 44 which are oriented in the downstream direction and which open out into the flow path of the gas stream. The air which circulates in the internal cavity 30 of the radial arm 26 is partly discharged through the holes 42 and projected onto the upstream end portion of the envelope so that it can be cooled. This air then flows around the radial arm 26 in the envelope 40 and is injected into the gas stream 16 via the holes 44.

During the operation of the jet engine, the cover 10 is exposed to high temperatures which may reach approximately 700 to 800° C., and the air which circulates in the cavities 30 of the radial arms 26 has a temperature of approximately 300 to 400° C., thus resulting in considerable differential thermal expansions between the cover and the casing.

The downstream end of the cover 10 is fastened to the bearing support 14 and its upstream end bears on the casing element 28 so that the cover maintains a freedom of axial expansion during operation.

Figure 2:
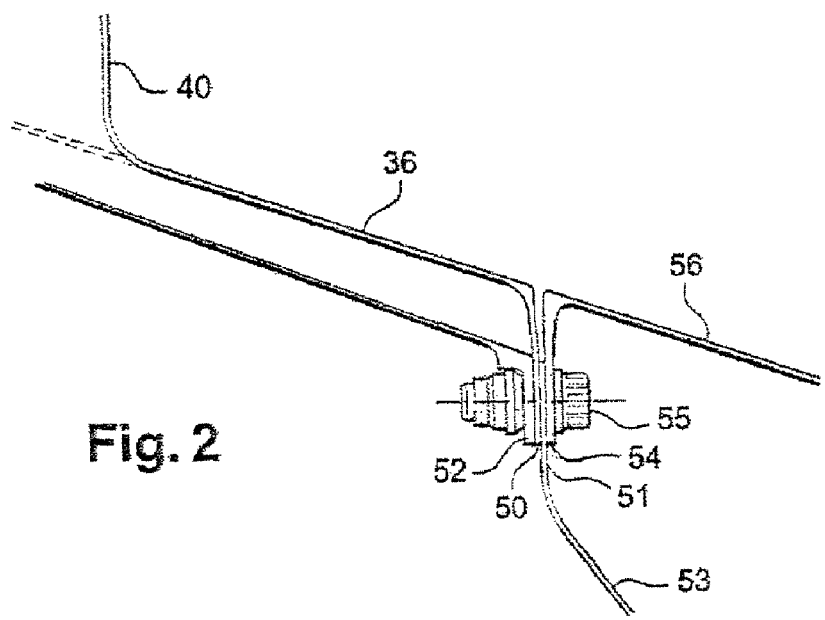
FIG. 2 is a view on an enlarged scale of the means for fastening the cover shown in FIG. 1.

In the example represented, the internal shell 36 of the cover comprises at its downstream end a radially internal annular flange 50 which is clamped by means of bolts 55 between an annular flange 52, situated upstream, of the wall 24 of the bearing support and the flanges 51, situated downstream, of an annular covering 53 and 54 of an exhaust cone 56 (FIG. 2), the exhaust cone extending in the downstream direction and being aligned with the internal shell 36 of the cover.

The upstream end of the internal shell 36 is fastened by riveting to elastically deformable means 58 which are borne by the bearing support 14 and allow differential thermal expansions between the cover and the bearing support.

Figure 3:
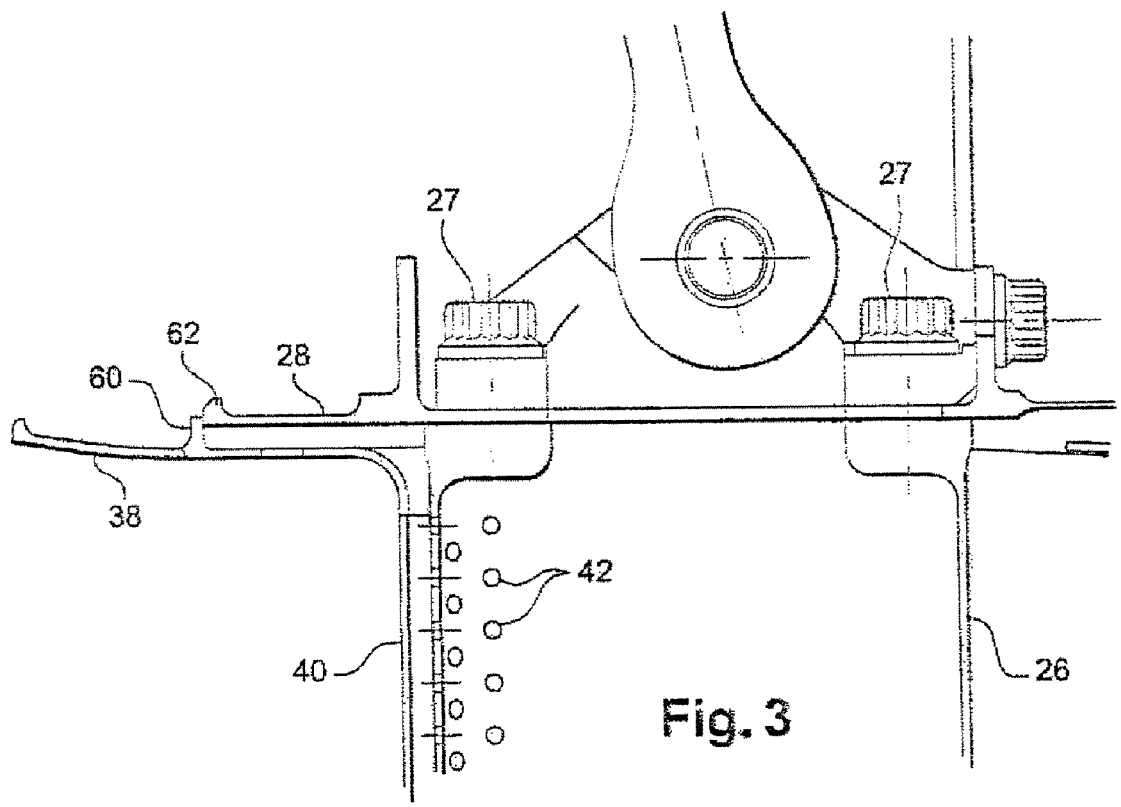
FIG. 3 is a view on an enlarged scale of the means for the axial bearing of the cover shown in FIG. 1.

The external shell 38 of the cover comprises, in the vicinity of its upstream end, a radially external annular lip 60 which has its downstream face bearing axially on the upstream face of an external annular lip 62 formed at the upstream end of the casing element 28 (FIG. 3). The radial dimension of the lip 60 is greater than the radial distance between the external shell 38 and the cylindrical element 28.

The downstream end of the casing element 28 comprises elastically deformable means 64 bearing radially on the downstream end of the external shell 38 of the cover.

In the current art, the cover has, in the free state, an axial dimension D, situated between the downstream bearing face of the radial lip 60 of the external shell and the upstream face of the flange 50 intended to be applied to the flange 52 of the bearing support, which is equal to the axial distance L between the downstream face of the flange 52 to which the flange 50 is applied and the upstream bearing face of the radial lip 62 of the casing element 28.

During operation, the cover expands axially and radially and the radial lip 60 of its external shell moves axially in the upstream direction in relation to its position in the free state, and thus no longer bears axially on the radial lip 62 of the casing element, a situation which may cause considerable vibration stresses in the cover and result in damage thereto.

The invention makes it possible to solve this problem by virtue of a cover whose aforementioned axial dimension D is less than the axial distance L, thereby requiring the cover to be placed under axial tension so that it can be mounted on the bearing support.

The difference between the axial dimension D and the axial distance L is substantially equal to the maximum deviation between the axial thermal expansion of the cover and the axial thermal expansion of the casing during the operation of the jet engine. When the axial thermal expansion of the cover becomes equal to this difference, the bearing face of the radial lip 60 is flush with the radial lip 62 of the casing element, but the radial thermal expansion of the cover is then such that it bears radially on the casing element 28, this being sufficient to prevent the appearance of vibration stresses in the cover.

The difference between the dimension D and the distance L is approximately 1 to 1.2 millimeters in one exemplary embodiment.

The radial distance R between the external shell 38 and the casing element 28 is advantageously equal to or slightly less than the maximum radial thermal expansion of the cover so that the cover is kept bearing axially and/or radially on the casing element during operation (FIG. 3).

The cover 10 can be mounted on the exhaust casing 12 in the following way, for example with a vertical arrangement of the components: with the casing being placed to bear on a support, tooling is placed to bear on the upstream portion of the bearing support and a force is applied thereto along the axis of the casing so as to shift the downstream position of the downstream flange 50 of the cover over a distance of 1 to 1.2 mm. While maintaining the position, the screws 25 and 27 for fastening the arms to the outer casing shell and to the bearing support are tightened.

The invention claimed is:

1. A casing cover for enclosing a casing in a jet engine, comprising:
   first and second coaxial shells, the first coaxial shell being arranged inside the second coaxial shell; and
   radial envelopes connecting the first coaxial shell to the second coaxial shell,
   wherein radial arms of the casing radially extend inside the radial envelopes,
   wherein the cover is fastened at a downstream end of the first coaxial shell to a first element of the casing and an upstream end of the second coaxial shell axially abuts against a second element of the casing, the downstream end of the first coaxial shell includes an annular flange and the upstream end of the second coaxial shell includes a radial lip, and
   wherein an axial dimension of the cover between the downstream end of the first coaxial shell and the upstream end of the second coaxial shell in a free state is less than an axial distance of the casing between the point where the first element of the casing is fastened to the downstream end of the first coaxial shell and the point where the second element of the casing abuts the upstream end of the second coaxial shell such that the cover is tensioned axially when mounted on and fastened to the casing.

2. The casing cover as claimed in claim 1, wherein a difference between the axial dimension of the cover, in the free state, and the axial distance between the point where the first element of the casing is fastened to the downstream end of the first coaxial shell and the point where the second element of the casing axially abuts the upstream end of the second coaxial shell is substantially equal to a maximum deviation between an axial thermal expansion of the cover and an axial thermal expansion of the casing during the operation of the jet engine.

3. The casing cover as claimed in claim 2, wherein the difference is approximately 1 to 1.2 millimeters.

4. The casing cover as claimed in claim 1, wherein the annular flange at the downstream end of the first coaxial shell is fastened to a flange of a bearing support by bolts and the radial lip at the upstream end of the second coaxial shell is disposed inside and upstream of a radial lip formed at an upstream end of the second element of the casing, the radial lip of the upstream end the second coaxial shell of the cover axially abuts the radial lip of the second element of the casing when the cover is mounted on the casing.

5. The casing cover as claimed in claim 4, wherein the radial lip of the upstream end of the second coaxial shell of the cover radially abuts the second element of the casing during the operation of the jet engine due to thermal expansion.

6. A jet engine which comprises at least one casing cover, as claimed in claim 1.

7. The casing cover as claimed in claim 1, wherein the radial envelopes have an axially profiled shape and include a plurality of holes oriented in a downstream direction and which open out into a flow path of a gas stream.

8. The casing cover as claimed in claim 7, wherein the radial arms include an internal cavity which circulates cooling air and a plurality of holes at an upstream end of the radial arms which open out toward an upstream end portion of the radial envelopes.

9. The casing cover as claimed in claim 1, wherein first radially inner ends of the radial arms of the casing are fastened to a cylindrical wall of a bearing support and second radially outer ends of the radial arms are fastened to a cylindrical casing element of the casing, and the bearing support includes a substantially frustoconical wall which extends downstream towards an axis of the jet engine and supports an outer race of a bearing.

10. The casing cover as claimed in claim 9, wherein the first element of the casing includes an annular flange attached to the cylindrical wall of the bearing support.

11. The casing cover as claimed in claim 10, wherein the second element of the casing includes a radial lip provided on the cylindrical casing element.

12. The casing cover as claimed in claim 9, wherein the a downstream end of the cylindrical casing element includes an elastically deformable member which radially abuts a downstream end of the second coaxial shell.

13. The casing cover as claimed in claim 1, wherein the cover is positioned such that a stream of hot gas originating from a combustion chamber and a turbine of the jet engine flows between an area defined between the first coaxial shell and the second coaxial shell.

* * * * *